United States Patent
Tanaka (10) Patent No.: US 7,362,945 B2
(45) Date of Patent: Apr. 22, 2008

(54) IMAGE PROCESSING APPARATUS, IMAGE PRINTING CONTROL APPARATUS, PRINT IMAGE DESIGNATION METHOD AND IMAGE PRINTING CONTROL METHOD

(75) Inventor: Hiroshi Tanaka, Asaka (JP)

(73) Assignee: Fujifilm Corporation, Tokyo (JP)

(*) Notice: Subject to any disclaimer, the term of this patent is extended or adjusted under 35 U.S.C. 154(b) by 690 days.

(21) Appl. No.: 10/803,964

(22) Filed: Mar. 19, 2004

(65) Prior Publication Data
US 2004/0184787 A1 Sep. 23, 2004

Related U.S. Application Data

(63) Continuation of application No. 09/256,367, filed on Feb. 24, 1999, now Pat. No. 6,728,466.

(30) Foreign Application Priority Data
Feb. 27, 1998 (JP) .................. 10-061875

(51) Int. Cl.
*H04N 5/91* (2006.01)
(52) U.S. Cl. .......................... 386/46; 386/95
(58) Field of Classification Search .......... 386/46, 386/95, 107, 117, 125; 355/40, 46
See application file for complete search history.

(56) References Cited

U.S. PATENT DOCUMENTS

| 5,023,635 | A |   | 6/1991 | Nealon |
| 5,508,783 | A |   | 4/1996 | Iwagaki et al. |
| 5,696,576 | A | * | 12/1997 | Itoh et al. ............ 355/40 |
| 5,702,169 | A |   | 12/1997 | Nishimura |
| 6,031,596 | A |   | 2/2000 | Ishii et al. |

* cited by examiner

*Primary Examiner*—Huy Nguyen
(74) *Attorney, Agent, or Firm*—Birch, Stewart, Kolasch & Birch, LLP (57) ABSTRACT

Printing of an image different from that designated by a user is prevented. Specifically, an image file in which image data has been stored and an order file in which ordering information that designates an image to be printed has been stored are recorded on a memory card. Stored in the image file is time stamp data indicating the time at which image data was stored in this image file. Stored in the order file is time stamp data indicating the time at which the ordering information was stored in the order file. If the time stamp data that has been stored in the order file indicates a time later than the time indicated by the time stamp data that has been stored in the image file, it is judged that the ordered image designated by the ordering information in the order file is the correct image designated by the user. This image is then printed.

2 Claims, 12 Drawing Sheets

ORDER FILE

[ORDERING INFORMATION 1]
ORDERED IMAGE FILE NAME = ¥IMFIDX10¥DSC0001.JPG
NUMBER OF ORDERED COPIES = 3
DESIGNATION TIME = 19980101123010

[ORDERING INFORMATION 2]
ORDERED IMAGE FILE NAME = ¥IMFIDX10¥DSC0004.JPG
NUMBER OF ORDERED COPIES = 3
DESIGNATION TIME = 19980103160030

[EOF]

ORDER FILE

[ORDERING INFORMATION 1]
ORDERED IMAGE FILE NAME = ¥IMFIDX10¥DSC0001.JPG
NUMBER OF ORDERED COPIES = 3
SECOND KEY INFORMATION(PARTIAL IMAGE DATA)

[ORDERING INFORMATION 2]
ORDERED IMAGE FILE NAME = ¥IMFIDX10¥DSC0004.JPG
NUMBER OF ORDERED COPIES = 3
SECOND KEY INFORMATION(PARTIAL IMAGE DATA)

[EOF]

Fig. 10

ORDER FILE

[ORDERING INFORMATION 1]
ORDERED IMAGE FILE NAME = ¥IMFIDX10¥DSC0001.JPG
NUMBER OF ORDERED COPIES = 3
SECOND KEY INFORMATION(ORDERD FILE RECORDING TIME)

[ORDERING INFORMATION 2]
ORDERED IMAGE FILE NAME = ¥IMFIDX10¥DSC0004.JPG
NUMBER OF ORDERED COPIES = 3
SECOND KEY INFORMATION(ORDERD FILE RECORDING TIME)

[EOF]

*Fig. 11*

ORDER FILE

[ORDERING INFORMATION 1]
ORDERED IMAGE FILE NAME = ¥IMFIDX10¥DSC0001.JPG
NUMBER OF ORDERED COPIES = 3
SECOND KEY INFORMATION(CHECKSUM DATA)

[ORDERING INFORMATION 2]
ORDERED IMAGE FILE NAME = ¥IMFIDX10¥DSC0004.JPG
NUMBER OF ORDERED COPIES = 3
SECOND KEY INFORMATION(CHECKSUM DATA)

[EOF]

Fig. 12

IMAGE PROCESSING APPARATUS, IMAGE PRINTING CONTROL APPARATUS, PRINT IMAGE DESIGNATION METHOD AND IMAGE PRINTING CONTROL METHOD

This application is a Continuation of Application No. 09/256,367, filed on Feb. 24, 1999 now U.S. Pat. No. 6,728,466, and for which priority is claimed under 35 U.S.C. § 120; and this application claims priority of Application No. 10-61875 filed in Japan on Feb. 27, 1998 under 35 § U.S.C. 119; the entire contents of all are hereby incorporated by reference; additionally a divisional application is being filed concurrently.

BACKGROUND OF THE INVENTION

1. Field of the Invention

This invention relates to an image processing apparatus for designating an image to be printed, an image printing control apparatus for printing the image, a print image designation method and an image printing control method.

2. Description of the Related Art

A digital electronic still-video camera captures the image of a subject and records image data representing the image of the subject on a memory card or some other recording medium. One takes the recording medium (or the entire camera if the recording medium cannot be loaded in and unloaded from the camera) to a developing laboratory, where a printer having a high image quality is used to print the image of the subject represented by the image data that has been recorded on the recording medium.

It has been contemplated in such case to record ordering information on the recording medium along with the image data. The ordering information indicates which images among the images represented by the image data recorded on the recording medium are to be printed.

Assume that ordering information has been recorded on the recording medium. If image data representing an image to be printed in accordance with the ordering information is erased, then it is necessary to erase the corresponding ordering information as well. If the corresponding ordering information is not erased from the recording medium, the ordering information will designate the printing of an image represented by image data newly recorded following erasure of the old image data in the area formerly occupied by the old image data which no longer exists on the recording medium. This results in the printing of the wrong image.

SUMMARY OF THE INVENTION

Accordingly, an object of the present invention is to prevent the ordering of the wrong image in a case where ordering information has been recorded on a recording medium.

According to a first aspect of the present invention, the foregoing object is attained by providing an image processing apparatus capable of accessing a recording medium on which has been recorded image data representing a plurality of images and image recording time data representing times at which the image data was recorded, comprising: an ordered-image designating device for designating an ordered image to be printed from among images represented by image data that has been stored on the recording medium; and an ordering information storage device for storing, in association with the ordered image, ordering information for the ordered image designated by the ordered-image designating device and designation time data representing time at which the ordered image was designated.

According to the first aspect of the present invention, there is also provided a method suited to the image processing apparatus described above. Specifically, there is provided a method of designating a print image in an image processing apparatus capable of accessing a recording medium on which has been recorded image data representing a plurality of images and image recording time data representing times at which the image data was recorded, comprising the steps of: designating an ordered image to be printed from among images represented by image data that has been stored on the recording medium, and storing, in association with the ordered image, ordering information for the ordered image designated and designation time data representing time at which the ordered image was designated.

In the first aspect of the present invention, image data representing an image and image recording time data representing the time at which the image data was recorded on the recording medium are recorded on the recording medium. The user designates an ordered image to be printed from among images represented by image data recorded on the recording medium. When the ordered image is designated, the ordering information relating to this ordered image and the designation time data representing the time at which this ordered image was designated are recorded on the recording medium in association with this ordered image.

According to a second aspect of the present invention, the ordered image designated based upon the first aspect of the present invention is printed. From the viewpoint of an image printing apparatus, the second aspect of the present invention comprises: a reading device for reading, from a recording medium on which have been recorded image data representing an image, recording time data, which is provided for each item of the image data, representing time at which the image data was recorded, ordering information for specifying an ordered image to be printed, and designation time data representing time at which the ordered image was designated, the image data, the recording time data, the ordering information and the designation time data; time data retrieval means (a time data retrieval device) for retrieving the recording time data and the designation time data regarding image data representing the ordered image specified by the ordering information; time determination means (a time determination device) for determining whether the recording time represented by the recording time data found by the time data retrieval means is earlier than designation time represented by the designation time data; and printing control means (a printing controller)—for printing the ordered image by a printing device if the time determination means has determined that the recording time is earlier than the designation time and for executing error processing if the time determination means has determined that the recording time is later than the designation time.

From the viewpoint of an image printing method, the second aspect of the present invention comprises the steps of: reading, from a recording medium on which have been recorded image data representing an image, recording time data, which is provided for each item of the image data, representing time at which the image data was recorded, ordering information for specifying an ordered image to be printed, and designation time data representing time at which the ordered image was designated, the image data, the recording time data, the ordering information and the designation time data; retrieving the recording time data and the designation time data regarding image data representing the ordered image specified by the ordering information; determining whether the recording time represented by the recording time data found is earlier than designation time represented by the designation time data; and printing the ordered image by a printing device if it has been determined that the recording time is earlier than the designation time and executing error processing if it has been determined that the recording time is later than the designation time.

When the ordering information and the designation time data are thus recorded on the recording medium in association with the ordered image, the image data, image recording time data, ordering information and designation time data recorded on the recording medium are read. The image recording time data relating to the ordered image and the designation time data relating to the ordered image specified by the ordering information that has been read are retrieved and a comparison is made between (a) the time at which the image data representing the ordered image indicated by the found image recording time data was recorded on the recording medium and (b) the time at which the ordered image indicated by the designation time data was designated.

When the result of the comparison indicates that the ordered image was designated prior to the recording of image data representing the ordered image, this means that the image that existed at the time of the designation was erased subsequent to the designation. Consequently, when the image specified by the ordering information is printed, error processing (cancellation of printing, for example) is executed because there is the danger that an image different from the image designated by the user will be printed.

In error processing, it is desired that the ordered image be printed after it is displayed on the display device to allow the user to verify that the image displayed on the display device is the ordered image that is to be printed. Further, in regard to error processing for a plurality of ordered images, ordered images of a number (one, for instance) fewer than the plurality of ordered images may be printed to permit confirmation of the ordered images.

When it is determined that an ordered image was designated after the recording of the image data representing the ordered image, it is judged that the ordered image was designated correctly by the ordering information and the ordered image specified by this ordering information is printed.

According to a third aspect of the present invention, the foregoing object is attained by providing an image processing apparatus capable of accessing a recording medium on which has been recorded image data representing a plurality of images, comprising: an ordered-image designating device for designating an ordered image to be printed from among images represented by image data that has been stored on the recording medium; and an ordering information storage device for storing, in association with the ordered image, ordering information for the ordered image designated by the ordered-image designating device, and key information for verifying the ordered image.

According to the third aspect of the present invention, there is also provided a method suited to the image processing apparatus described above. Specifically, there is provided a method of designating a print image in an image processing apparatus capable of accessing a recording medium on which has been recorded image data representing a plurality of images, comprising the steps of: designating an ordered image to be printed from among images represented by image data that has been stored on the recording medium; and storing, in association with the ordered image, ordering information for the ordered image designated and key information for verifying the ordered image.

In the third aspect of the invention, image data representing an image is recorded on the recording medium. The user designates an ordered image to be printed from among images represented by image data recorded on the recording medium. When the ordered image is designated, the ordering information relating to this ordered image and the key information relating to the ordered image is recorded on the recording medium in association with this ordered image.

When the ordering information and the key information is thus recorded on the recording medium in association with the ordered image, the image data, ordering information and key information recorded on the recording medium are read. On the basis of the key information, it is determined whether the ordered image specified by the ordering information that has been read is an image designated by the user. If it is determined that the ordered image is an image designated by the user, the image is printed. If it is determined that the ordered image is not an image designated by the user, then the above-described error processing is executed.

A fourth aspect of the present invention relates to printing processing. From the viewpoint of an image printing apparatus, the fourth aspect of the present invention comprises: a reading device for reading, from a recording medium on which have been recorded image data representing an image, first key information, which is provided for each item of the image data, relating to the image data, ordering information for specifying an ordered image to be printed, and second key information relating to the ordering information, the image data, the first key information, the ordering information and the second key information; key-information retrieval means (a key-information retrieval device) for retrieving the first key information and the second key information regarding image data representing the ordered image specified by the ordering information; key-information match determination means (a key-information match determination device) for determining whether the first key information found by the key-information retrieval means matches the second key information found by the key-information retrieval means; and printing control means (a printing control device) for printing the ordered image by a printing device if the key-information match determination means has determined that the first key information matches the second key information and for executing error processing if the key-information match determination means has determined that the first key information does not match the second key information.

From the viewpoint of an image printing method, the fourth aspect of the present invention comprises the steps of: reading, from a recording medium on which have been recorded image data representing an image, first key information, which is provided for each item of the image data, relating to the image data, ordering information for specifying an ordered image to be printed, and second key information relating to the ordering information, the image data, the first key information, the ordering information and the second key information; retrieving the first key information and the second key information regarding image data representing the ordered image specified by the ordering information; determining whether the first key information found matches the second key information found; and printing the ordered image by a printing device if it has been determined that the first key information matches the second key information and executing error processing if it has been determined that the first key information does not match the second key information.

It is determined whether the first key information (which may be intrinsic information or information generated from the ordered image) matches the second key information. If a match is obtained, it is judged that the ordered image was designated correctly by the ordering information and the ordered image specified by this ordering information is printed. If a match is not obtained, this means that the image designated by the ordering information does not specify the correct ordered image and, hence, the above-described error processing is executed.

The above-mentioned key information (first key information and second key information) may be partial image data representing part of the ordered image, the checksum of the ordered image, data representing the time at which the image data representing the ordered image was recorded on the recording medium, or data representing a random number generated at recording of the ordered image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
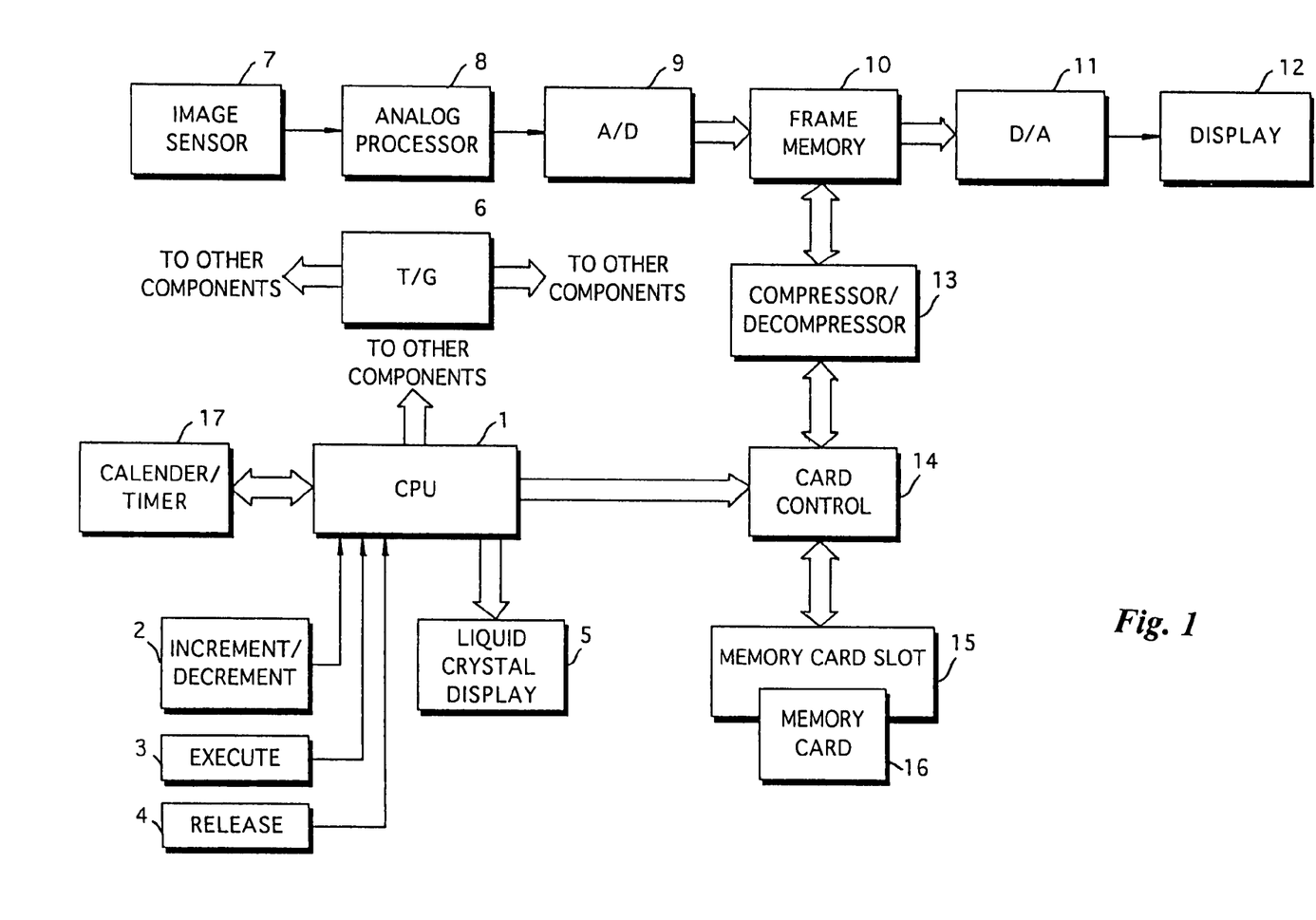
FIG. 1 is a block diagram illustrating the electrical configuration of a digital electronic still-video camera according to the present invention.

FIG. 1 is a block diagram showing the electrical configuration of a digital electronic still-video camera embodying the present invention.

The overall operation of the digital electronic still-video camera is supervised by a CPU 1. The digital electronic still-video camera includes a timing generator 6 for supplying each of its circuits with clock pulses, and a calendar timer 17, which is for measuring time, connected to the CPU 1. The latter is capable also of generating random numbers.

The digital electronic still-video camera is capable of recording image data on a memory card 16 as well as ordering information for designating printing of an image represented by image data recorded on the memory card 16. The digital electronic still-video camera further includes an increment/decrement button 2, an execute button 3 and a shutter release button 4 in order to designate an ordered image that is to be printed. Signals indicating depression of these buttons enter the CPU 1. Also included in the camera is a liquid crystal display circuit 5 for displaying various information such as the number of frames necessary for photography.

Sensing a subject causes an image signal representing the image of the subject to be output from an image sensing circuit 7 and to enter an analog processing circuit 8. The image signal is subjected to amplification processing in the analog processing circuit 8 and the amplified signal is converted to digital image data in an analog/digital converter circuit 9. One frame of the digital image data is applied to a frame memory 10, where the data is stored temporarily.

One frame of image data is read out of the frame memory 10 and then restored to an analog image signal in a digital/analog converter circuit 11. The analog image signal is input to a display device 12, whereby the image of the subject is displayed on the display screen of the display device 12. While observing the image of the subject displayed on the display device 12, the user photographs the subject.

When a shutter release button 4 is pressed by the user, image data obtained by photography and stored in the frame memory 10 is read out as mentioned above and undergoes data compression in a compression/de-compression circuit 13.

The freely removable memory card 16 has been loaded in a memory card slot 15 of the digital electronic still-video camera. Image data that has been compressed by the compression/decompression circuit 13 is recorded on the memory card 16 by a card control circuit 14. Further, the time indicated by the calendar timer 17 is read by the CPU 1 and is recorded on the memory card 16 in association with the image data as time stamp data (recording time data) indicating the time at which the image data was recorded.

Figure 2:
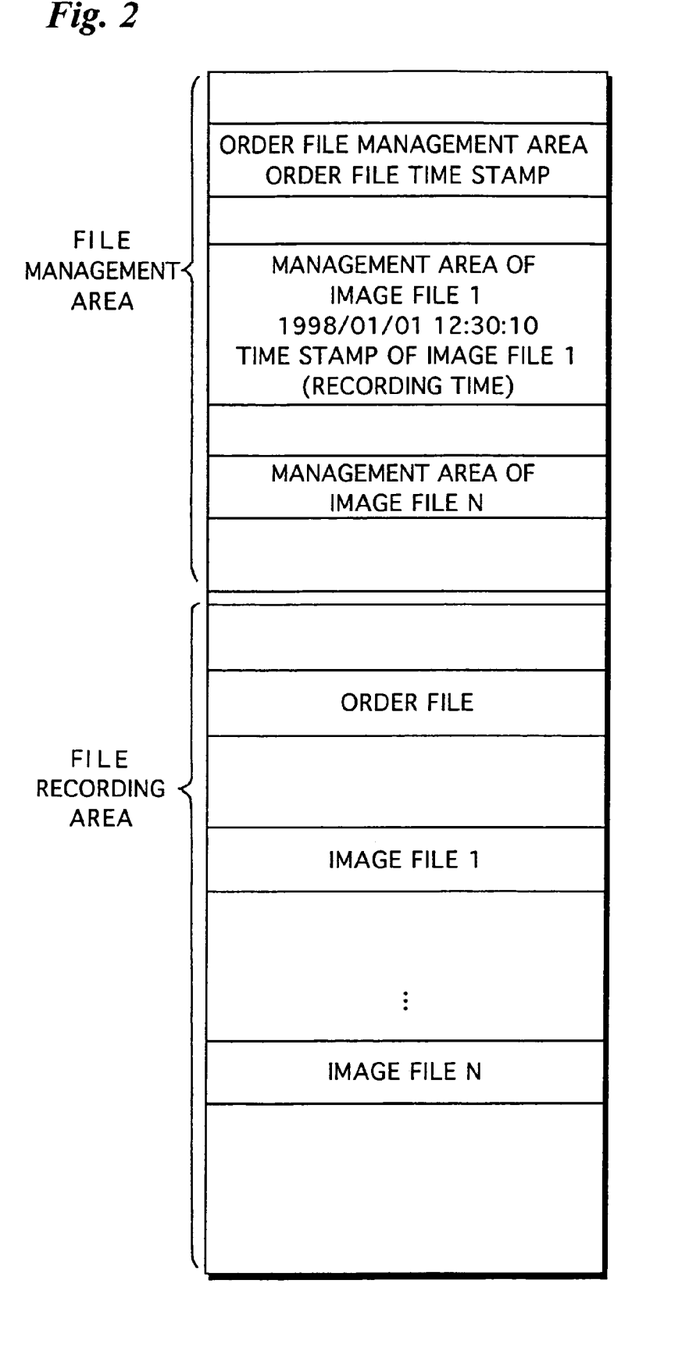
FIG. 2 illustrates storage of data on a memory card.

FIG. 2 illustrates storage of data on the memory card 16.

The recording area of the memory card 16 includes a file management area and a file recording area.

The management area manages data that has been recorded in the file recording area (and also manages paths to order files and image files). Stored in this area are paths to order files and image files, time stamp data indicating the times at which an image files were created (recorded) and time stamp data indicating the times at which order files were created, etc. Since the digital electronic still-video camera shown in FIG. 1 is capable of recording ordering information on the memory card 16 in addition to image data, an order-file management area storing ordering information also exists in addition to the file management area and an image-file management area storing the image data. File management areas are provided to conform to the number of frames of image data stored on the memory card 16.

The file recording area is for recording order files storing ordering information and image files storing image data. Here n-number of image files have been stored and image data representing a total of n-number of images have been stored by the n-number of image files.

Figure 3:
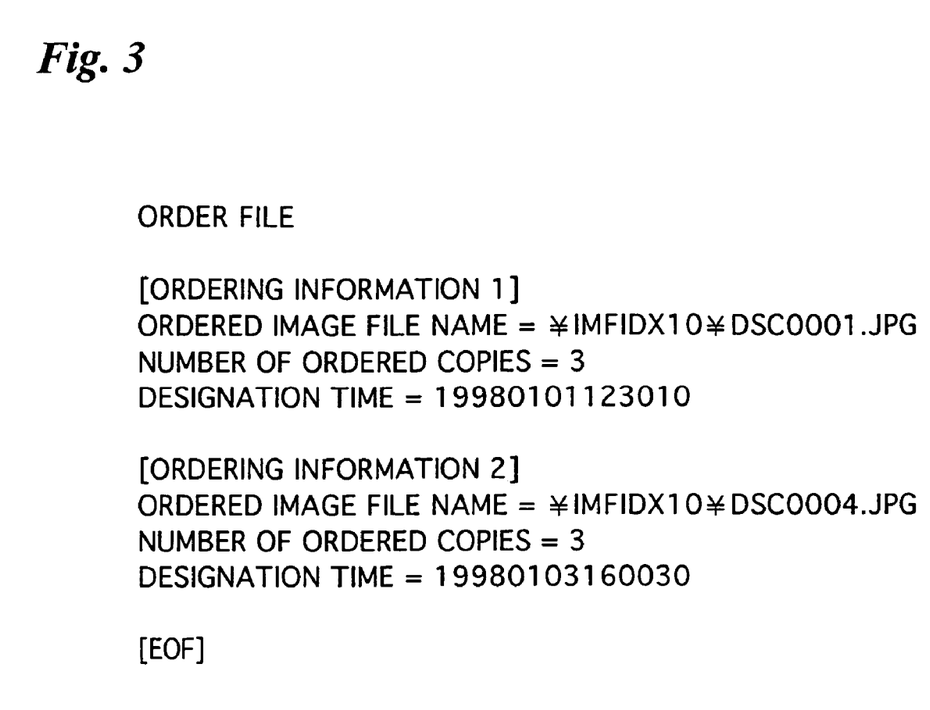
FIG. 3 shows an order file.

FIG. 3 illustrates an example of the content of an order file.

Stored in the order file is ordering information for designating images to be printed among images represented by image data recorded on the memory card 16. In this embodiment, it is assumed that an image represented by image data having the file name "DSC0001.JPG" and an image represented by image data having the file name "DSC0004.JPG" have been designated as ordered images to be printed.

Ordering information includes data representing the image file name of the ordered image, the number of ordered copies of the ordered image and second key information.

(Here designation time, namely the time at which ordering of the information was designated, is the second key information.) EOF (End of File) data indicating the end of the order file is recorded at the very end of the order file.

Figure 4:
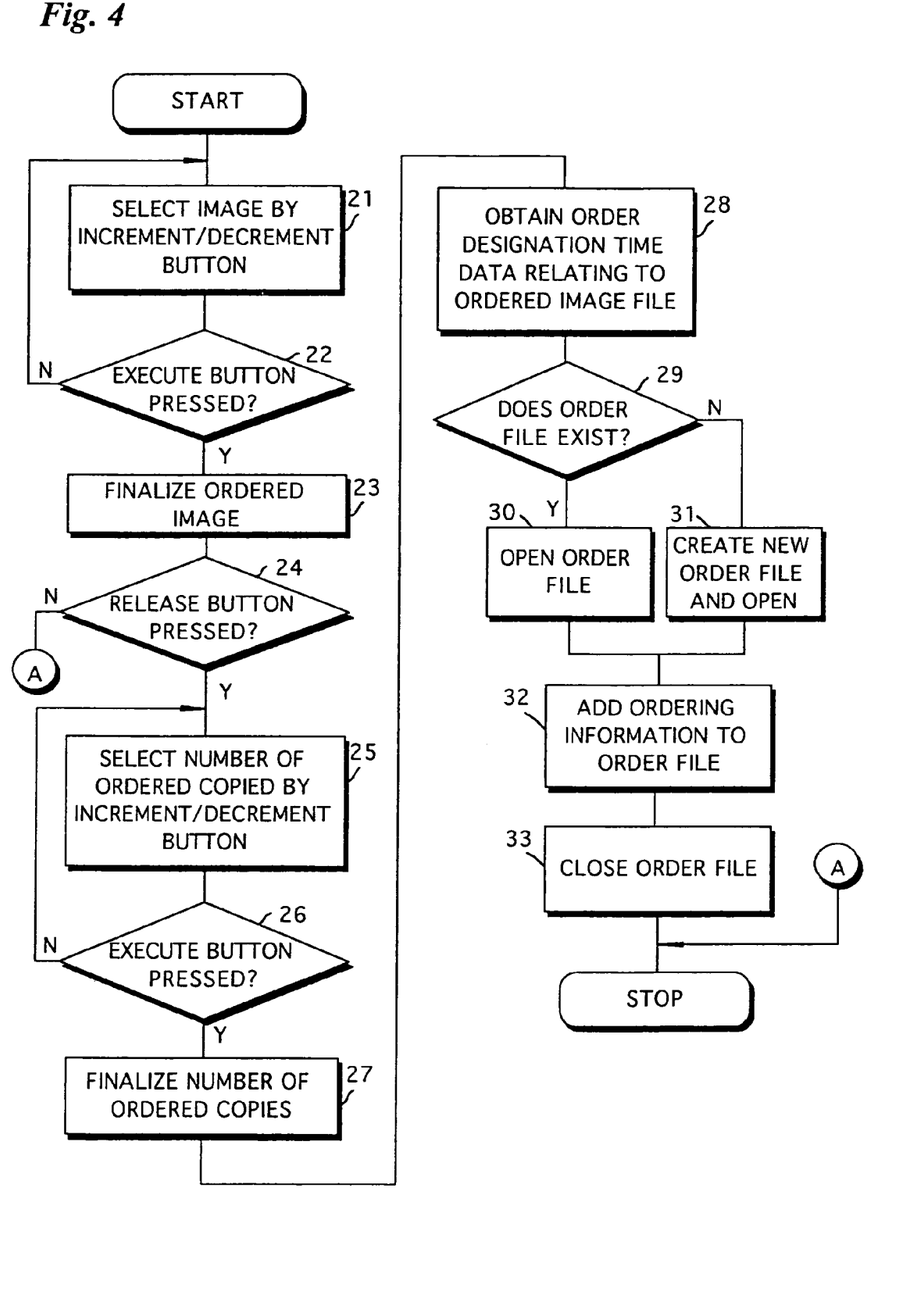
FIG. 4 is a flowchart illustrating a processing procedure for recording ordering information.

FIG. 4 is a flowchart illustrating a processing procedure for designating an ordered image to be printed from among images represented by image data stored on the memory card 16. It is assumed here that the digital electronic still-video camera has been set to a mode for designating ordered images.

Compressed image data that has been recorded on the memory card 16 is read by the card control circuit 14 and decompressed by the compression/decompression circuit 13. The decompressed image data is input to the display device 12 via the frame memory 10 and digital/analog converter circuit 11, whereby the image represented by the image data stored on the memory card 16 is displayed on the display screen of the display device 12.

The increment/decrement button 2 is pressed by the user so that a desired image represented by the image data recorded on the memory card 16 is displayed on the display screen of the display device 12 (step 21).

Next, by pressing the execute button 3, the image being displayed on the display device 12 is designated (step 22) and accepted (step 23) as an ordered image to be printed.

Next, the user presses the shutter release button 4 ("YES" at step 24) and operates the increment/decrement button 2 to select the number of ordered copies of the ordered image (step 25). By then pressing the execute button 3 ("YES" at step 26), the user finalizes the number of ordered copies selected by the increment/decrement button 2 (step 27).

When the number of ordered copies has been finalized, order designation time data representing the time at which the number of ordered copies was finalized is read from the calendar timer 17 (step 28).

Next, it is determined whether an order file has already been created on the memory card 16 (step 29). If an order file has been created, then this order file is opened and the ordering information is displayed on the display device 12 ("YES" at step 29; step 30). If an order file has not yet been created, then an order file is created and the order file is opened ("NO" at step 29; step 31).

When the order file is opened, new ordering information is added to the order file (step 32). By way of example, in a case where ordering information 1 shown in FIG. 3 has been stored in the order file, assume that the image file name of the ordered image is "DSC004.JPG", that the number of ordered copies is three and that the time at which the number of ordered copies was designated is 16:00:30 on Jan. 3, 1998. In such case, new ordering information 2, in which "¥IMFIDX10¥DSC0004.JPG" serves as the ordered image file name, "3" is the number of ordered copies and "19980103160030" is the designation time data, is written into the order file. Thereafter, the order file is closed (step 33).

In this embodiment, designated-time data is stored for every ordered image in the order file. However, time stamp data of an order file may be used collectively as designation time data corresponding to all ordered images.

When ordering information has been written into an order file on the memory card 16, the user brings the memory card 16 to a developing laboratory and the ordered images are printed by a high-quality printer installed at the laboratory. (Naturally the user can print the desired images using a printer in his or her possession.) Next printing processing of the ordered images will be described.

Figure 5:
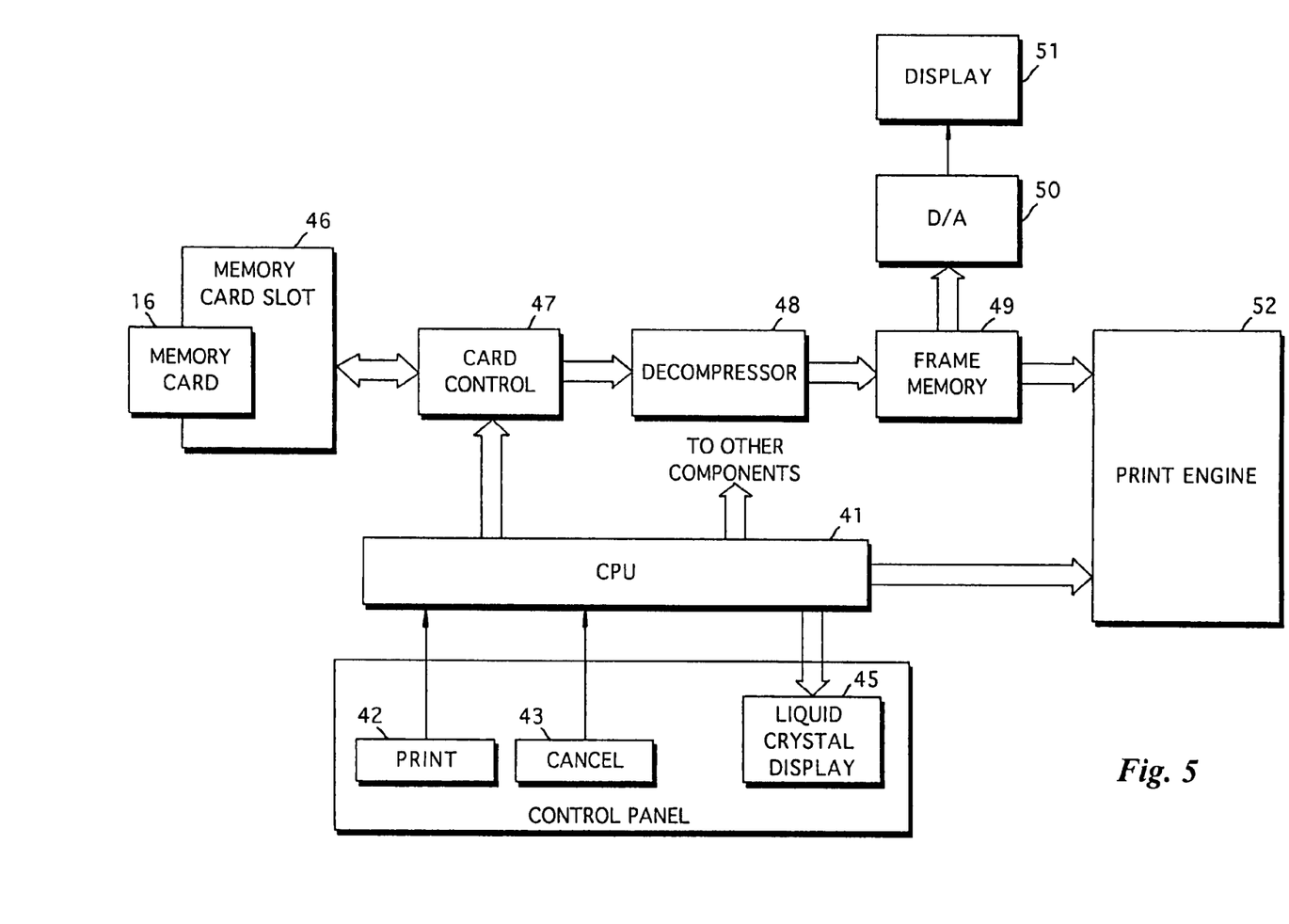
FIG. 5 is a block diagram showing the electrical configuration of a printer.

FIG. 5 is a block diagram showing the electrical configuration of a printer with which an laboratory is equipped.

The overall operation of the printer is supervised by a CPU 41. The printer has a print button 42 and a print cancel button 43. Signals indicating depression of these buttons 42 and 43 enter the CPU 41. The printer further includes a liquid crystal display device 45 for displaying various information.

The memory card 16 is capable of being removably loaded in the printer. For this purpose the printer has a memory card slot 46 for inserting the memory card 16.

The memory card 16 is inserted into the memory card slot 46. Compressed image data that has been recorded on the memory card 16 is read out by a card control circuit 47. The compressed image data is decompressed by a decompression circuit 48 and then stored in a frame memory 49 temporarily.

Image data is read out the frame memory 49 and then converted to an analog image signal in a digital/analog converter circuit 50. The analog image signal resulting from the conversion is input to the display device 51, whereby the image represented by the image data stored on the memory card 16 is displayed on display device 51.

Further, the image data that has been stored in the frame memory 49 is read out and applied to a print engine 52, whereby the image is printed.

Figure 6:
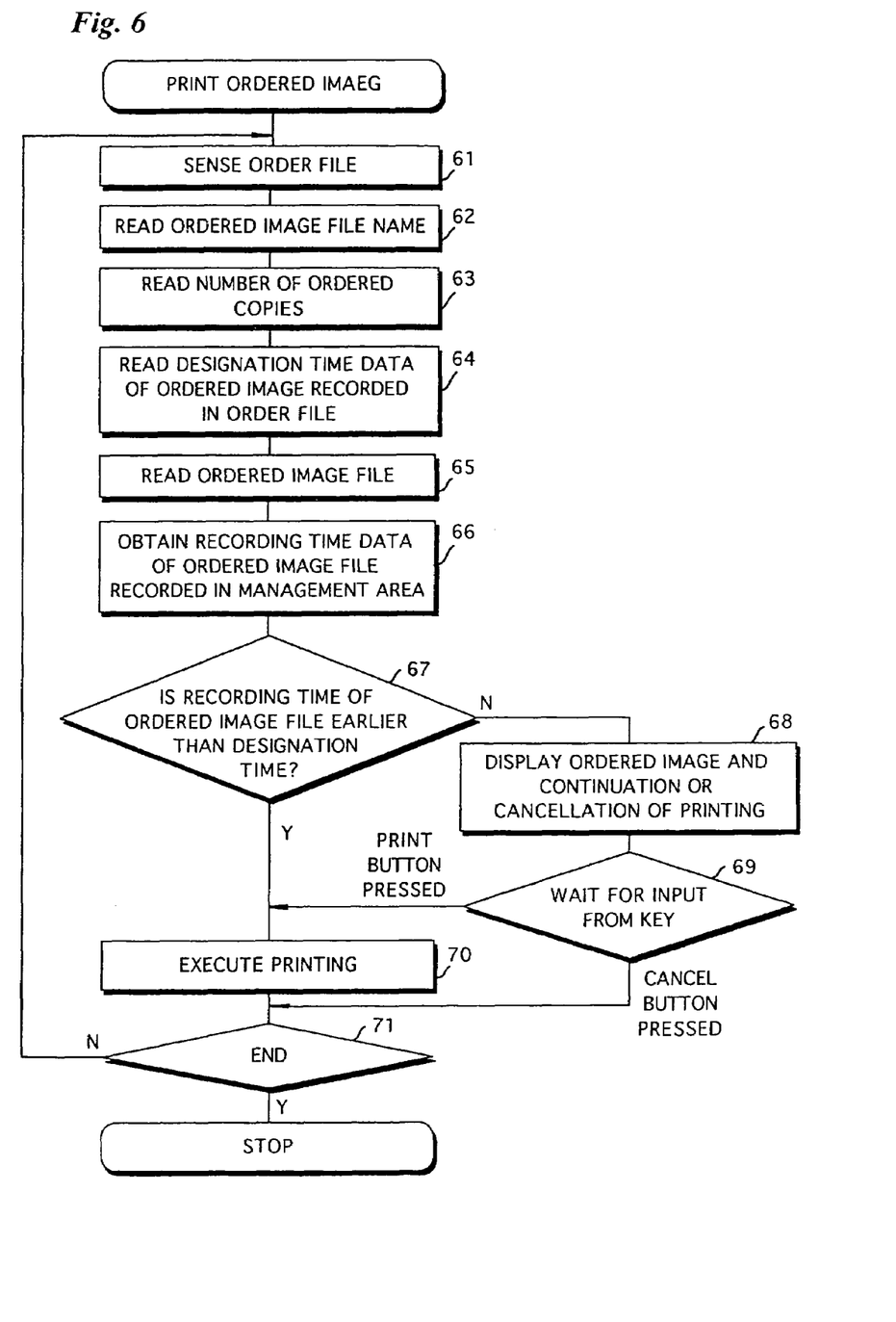
FIG. 6 is a flowchart showing a processing procedure for printing an ordered image.

FIG. 6 is a flowchart illustrating a processing procedure for printing an ordered image.

If the memory card 16 on which an order file has been stored is inserted into the memory card slot 46 of the printer, the order file stored on the memory card 16 is sensed by the card control circuit 47 (step 61). If the order file is sensed, then the ordered image file name, the number of ordered copies and the designation time data contained in the ordering information stored in the order file are read out (steps 62, 63 and 64).

The ordered image file having the ordered image file name that was read is read from the memory card 16 (step 65). Further, the recording time data of the ordered image file that has been stored in the file management area of the memory card 16 is read (step 66).

It is determined at step 67 whether the recording time represented by the recording time data of the ordered image stored in the file management area indicates a time earlier than the designation time represented by the designation time data stored in the order file.

If the time at which the image file was recorded on the memory card 16 is earlier than the time at which the ordering information was recorded ("YES" at step 67), this means that the image represented by the image data having the ordered image file name designated by the ordering information is the correct image ordered by the user. In response, the image data represented by the image data stored in the image file having the ordered image file name designated by the ordering information is applied to the print engine 52, which proceeds to print the image (step 70).

If the recording time indicates a time later than the destination time ("NO" at step 67), then there is the danger that the image that the user is attempting to print was erased after the ordering information was recorded. Accordingly, it is judged that the image represented by the image data having the ordered image file name designated by the ordering information is an image different from that ordered by the user. In such case the image data having the ordered image file designated by the ordering information is read out of the memory card 16, applied to the display device 51 and displayed for purposes of confirmation. Further, the display device 51 presents a display prompting the user to continue with or cancel the printing of the image displayed on its display screen (step 68).

Upon observing the image displayed on the display device 51 and confirming that the image is one to be printed, the operator of the printer presses the print button 42 (step 69). In response, the image data that has been stored in the frame memory 49 is applied to the print engine 52 and is printed thereby (step 70).

Upon observing the image displayed on the display device 51 and confirming that the image is different from one to be printed, the operator of the printer presses the print cancel button 43 (step 69). In response, an image different from the ordered image can be prevented from being printed.

Processing from step 61 to step 70 is repeated until the EOF stored in the order file is sensed (step 71).

Figure 7:
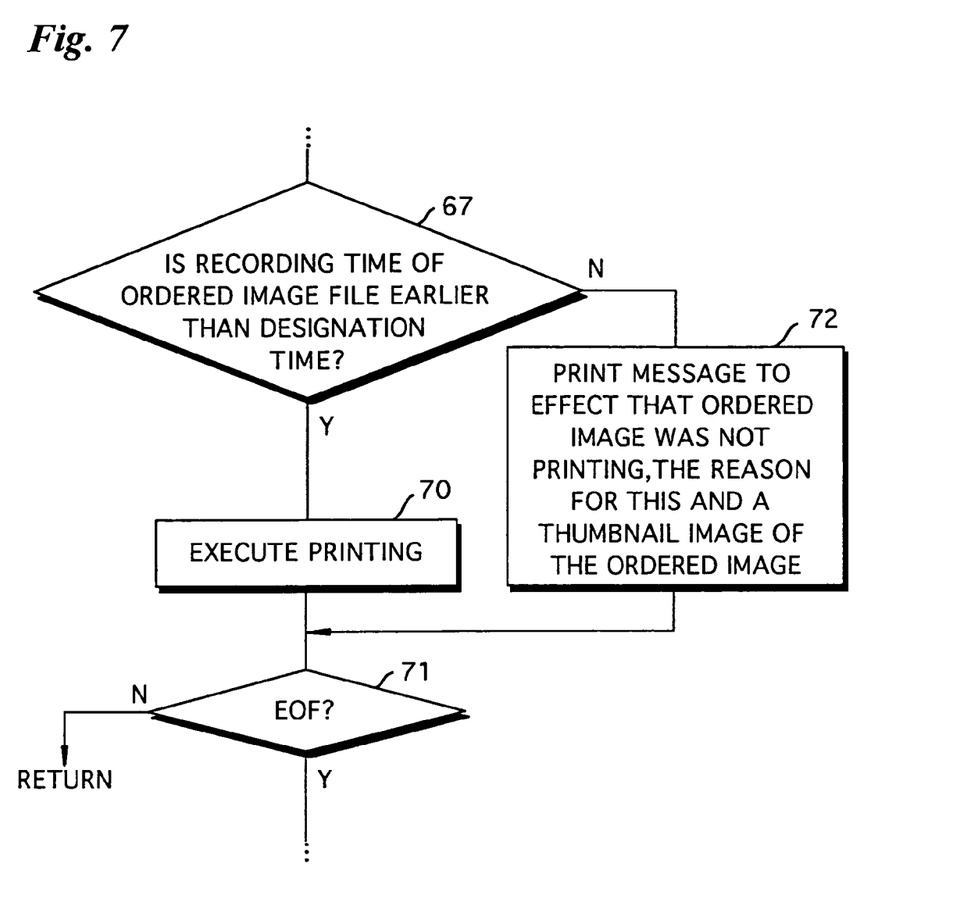
FIG. 7 is a flowchart showing part of the processing procedure for printing an ordered image.

In the processing described above, the operator of the printer is allowed to enter whether an image should be printed or the printing thereof canceled when the time at which the ordered image was designated is earlier than the time at which the ordered image was recorded. However, an arrangement may be adopted in which a thumbnail image of the ordered image designated by the ordering information, a message to the effect that the ordered image should not be printed and the reason are printed (FIG. 7; step 72).

In the above-described embodiment, a decision to print an ordered image or to execute error processing is rendered based upon whether the time at which an ordered image was recorded is earlier than the time at which the ordered image was designated. However, it is also possible to record first key information regarding image data and second key information regarding ordering information on the memory card 16, compare the first key information and the second key information at the time of printing and print the ordered image if the first key information matches the second key information.

An example in which partial image data representing an image that is part of an ordered image is used as the first and second key information will now be described.

Figure 8:
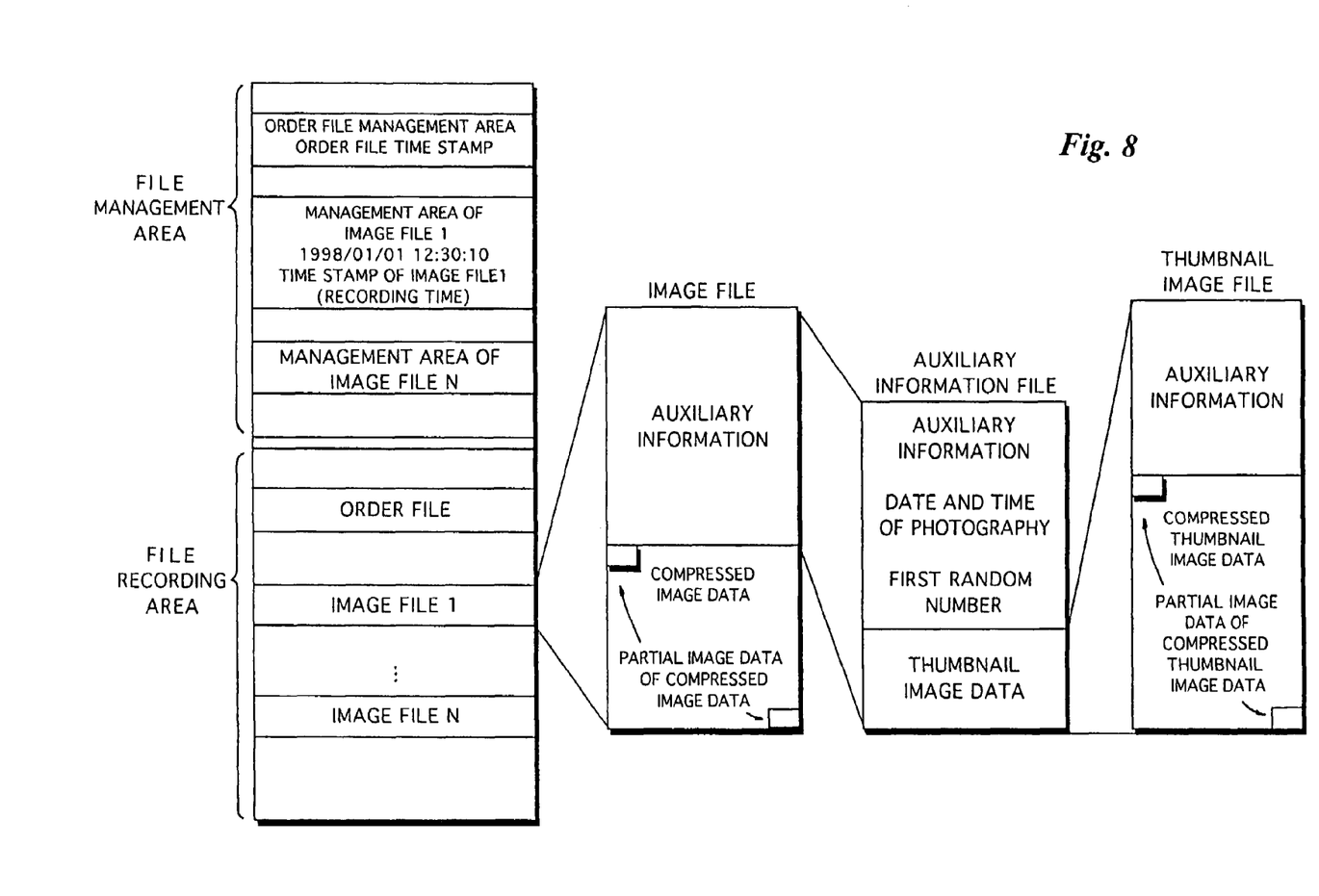
FIG. 8 shows storage of data on a memory card.
Figure 9:
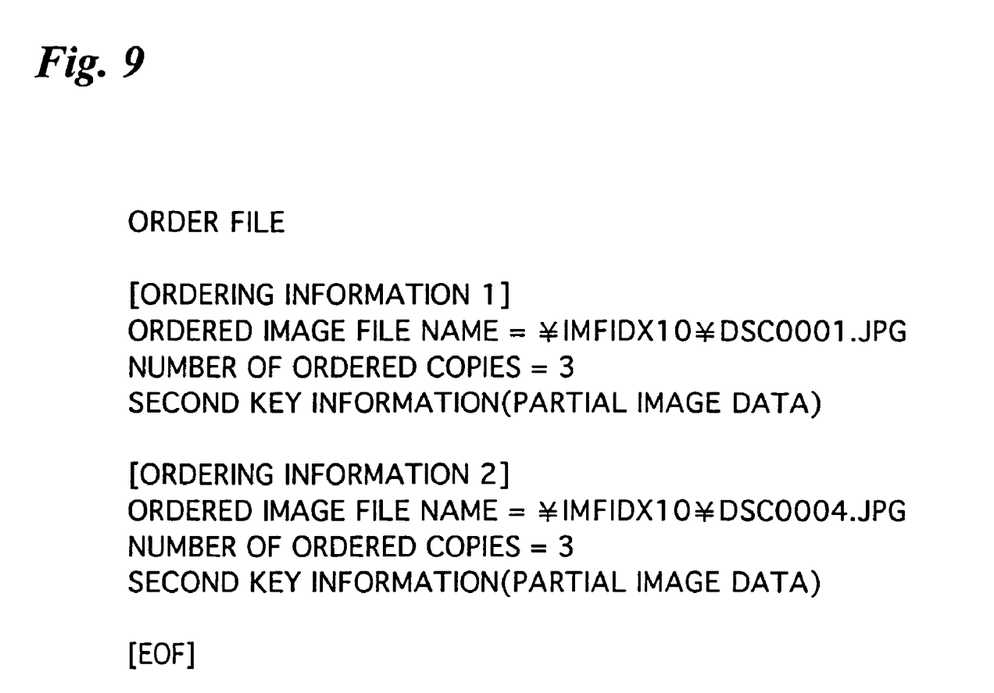
FIGS. 9 to 11 show order files.
Figure 10:
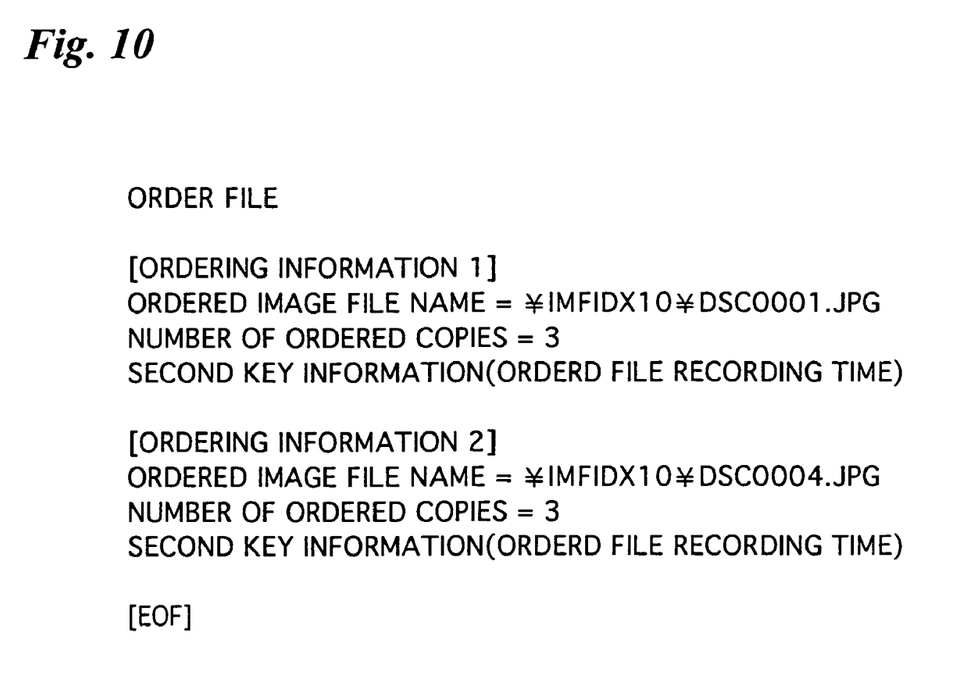
Figure 11:
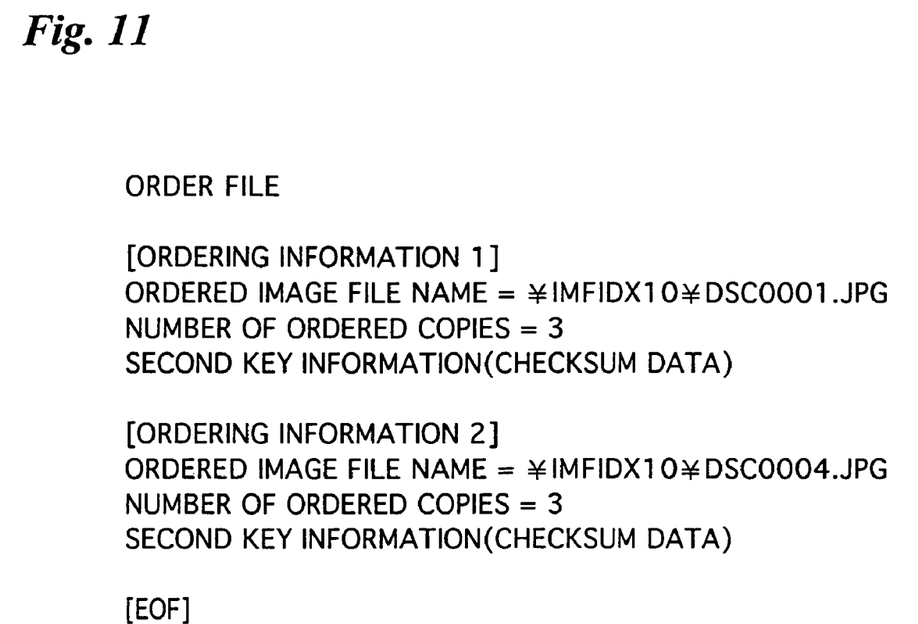
Figure 12:
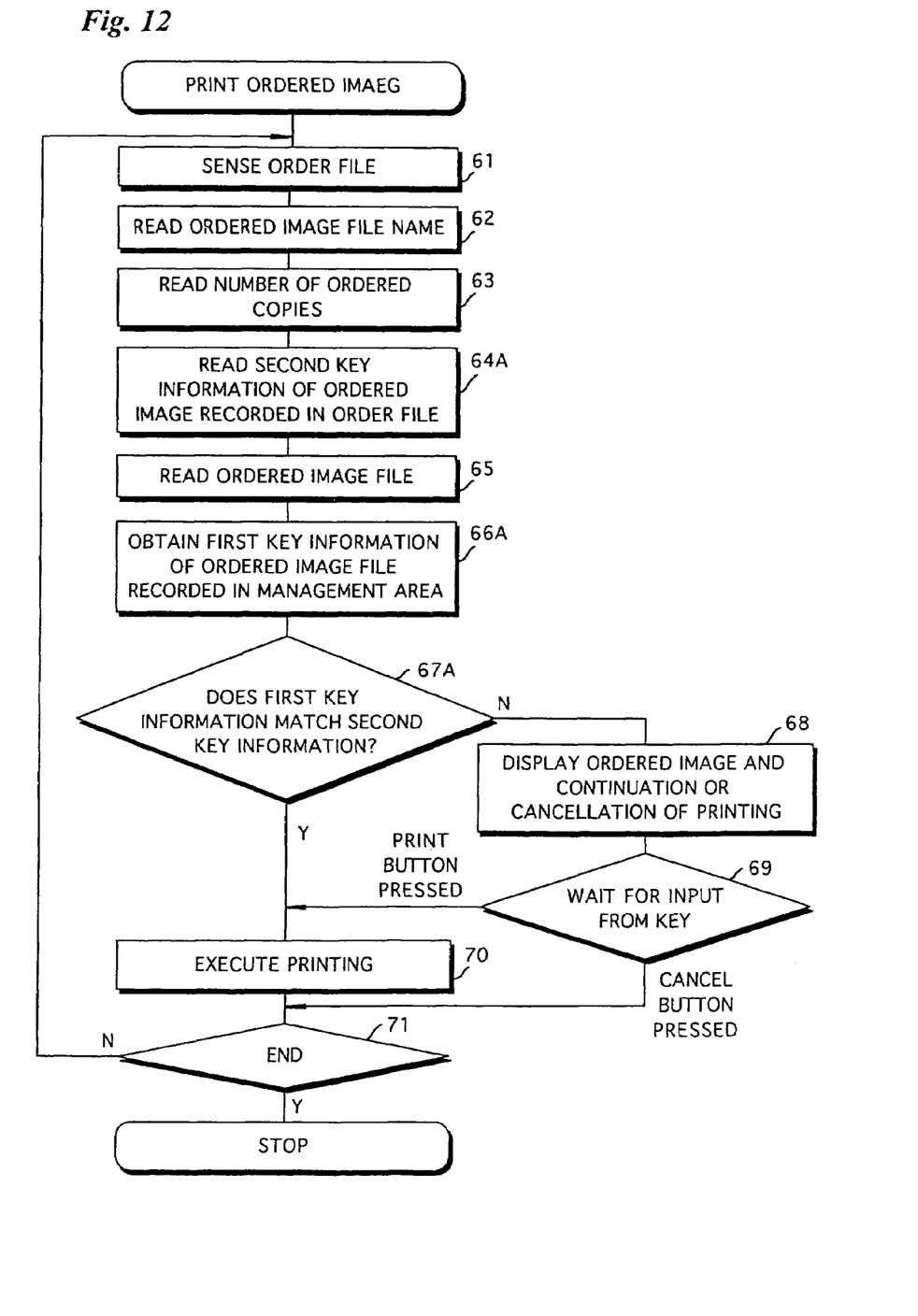
FIG. 12 is a flowchart illustrating a processing procedure for printing an ordered image.

FIG. 8 illustrates storage of data on a memory card, FIGS. 9 to 11 illustrate order files, and FIG. 12 is a flowchart illustrating a processing procedure for printing an ordered image. Processing steps in FIG. 12 identical with those shown in FIG. 6 are designated by like step numbers and are not described again.

An image file includes an area for recording auxiliary information in addition to an area for recording image data representing an image. A thumbnail image file has been stored in an area constituting part of the auxiliary information area. Compressed thumbnail image data and its auxiliary information have been stored in the thumbnail image file.

Data that is part of the image data representing an image that has been stored in an image file (i.e., data representing the beginning of the image, data representing the end of the image, etc.) is written into ordering information in the manner shown in FIG. 9. (The partial image data that forms part of the image data stored in the image file is itself the first key information, and the partial image data that has been written into the ordering information is the second key information.) When an ordered image is printed by the printer, the printer reads the data (the second key information) forming part of the image data that has been stored in the ordered image file and the partial image data (the first key information) that has been stored in the ordering infor-mation of the order file (steps 64A, 65, 66A). It is then judged whether the first key information matches the second key information (step 67A).

If a match is achieved ("YES" at step 67A), the image designated by the ordering information is printed by reason of the fact that this image is the correct ordered image designated by the user. If a match is not achieved (NO" at step 67A), it is deemed that the image designated by the ordering information is an image different from the image designated by the user and, as a result, processing for confirming this or processing (error processing) for printing a thumbnail image is executed in the manner described above.

It is also permissible to write data that is part of thumbnail image data as key information of ordering information. In such case the printer judges, when an ordered image is printed, whether image data (first key information) constituting part of thumbnail image data that has been written in the ordered image file matches image data (second key information) that has been stored in ordering information in the order file.

As in the case where part of the image data was written as key information, processing for printing the ordered image is executed if a match is achieved and the above-described error processing is executed if a match is not achieved.

In a case where data (first key information) representing the date of photography is recorded in the auxiliary information area of an image file, it is also permissible to write data representing the date of photography into an order file (second key information), as shown in FIG. 10, and determine whether data representing the date of photography written in the auxiliary information area of the image file matches data representing the date of photography written into the order file. The ordered image is printed if a match is achieved and the above-described error processing is executed if a match is not achieved.

Further, an arrangement may be adopted in which the checksum (the sum of the quantity of image data) of image data or of compressed image data is written into ordering information. In such case a checksum obtained from image data or compressed image data acquired from an image file would be adopted as the first key information and a checksum that has been written into the ordering information in the manner shown in FIG. 11 would be adopted as the second key information. It goes without saying that the ordered image would be printed or error processing executed based upon whether a match is or is not achieved between the first key information and second key information.

Further, it may be so arranged that in a case where a random number (a first random number, i.e., first key information) is generated by the CPU 1 when an image is recorded, data representing this generated first random number is recorded in the auxiliary information area of an image file and the image represented by the image data of the image file having the data representing this first random number has been designated as the ordered image, the data representing the first random number is recorded in the order file as data representing a second random number (second key information). It is then determined whether the data representing the first random number stored in the image file matches the data representing the second random number stored in the order file. Processing for printing the ordered image is executed in case of a match and the above-described error processing is executed in case of a non-match.

Though the circuits described above are expressed in the form of hardware, some or all of these circuits may be implemented by software.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of accessing a recording medium on which both image data representing a plurality of images and image recording time data representing times at which the image data is recorded are electrically recordable and erasable, comprising:

an ordered-image designating device for designating an ordered image to be printed from among images represented by image data that has been stored on the recording medium; and an ordering information record control device for electrically recording on the recording medium, in association with the image data representing the ordered image, ordering information for the ordered image designated by said ordered-image designating device and designation time data representing time at which the ordered image is designated.

2. A method of designating a print image in an image processing apparatus capable of accessing a recording medium on which both image data representing a plurality of images and image recording time data representing times at which the image data was recorded are electrically recordable and erasable, comprising the steps of:

designating an ordered image to be printed from among images represented by image data that has been stored on the recording medium; and electrically recording on the recording medium, in association with the image data representing the ordered image, ordering information for the ordered image designated and designation time data representing time at which the ordered image is designated.

* * * * *